(12) United States Patent
Bandera

(10) Patent No.: US 10,557,503 B2
(45) Date of Patent: Feb. 11, 2020

(54) BEARING MOUNT AND PRELOAD ASSEMBLY

(71) Applicant: HONEYWELL INTERNATIONAL INC., Morris Plains, NJ (US)

(72) Inventor: Pablo Bandera, Avondale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 552 days.

(21) Appl. No.: 15/184,515

(22) Filed: Jun. 16, 2016

(65) Prior Publication Data
US 2017/0363147 A1 Dec. 21, 2017

(51) Int. Cl.
| F16C 35/067 | (2006.01) |
| F16C 11/00 | (2006.01) |
| F16C 19/06 | (2006.01) |
| F16M 11/12 | (2006.01) |
| F16C 27/06 | (2006.01) |
| F16C 11/04 | (2006.01) |
| F16C 25/08 | (2006.01) |

(Continued)

(52) U.S. Cl.
CPC ............ *F16C 35/067* (2013.01); *F16C 11/00* (2013.01); *F16C 11/045* (2013.01); *F16C 19/06* (2013.01); *F16C 25/08* (2013.01); *F16C 27/066* (2013.01); *F16D 3/28* (2013.01); *F16D 11/06* (2013.01); *F16D 23/08* (2013.01); *F16M 11/123* (2013.01); *F16C 2229/00* (2013.01); *G01C 21/18* (2013.01)

(58) Field of Classification Search
CPC .................................. G01C 19/18; G01C 19/16
See application file for complete search history.

(56) References Cited

U.S. PATENT DOCUMENTS 3,002,392 A * 10/1961 Scotto .................. G01C 19/16
74/5 F
3,260,123 A * 7/1966 Dickie .................. G01C 19/16
188/268

(Continued)

FOREIGN PATENT DOCUMENTS

DE 859547 C 12/1952
DE 102007021057 A1 11/2008

(Continued)

OTHER PUBLICATIONS

Extended EP Search Report for Application No. 17175862.6-1751 dated Nov. 15, 2017.

(Continued)

*Primary Examiner* — Terence Boes
(74) *Attorney, Agent, or Firm* — Lorenz & Kopf, LLP

(57) ABSTRACT

An assembly includes a first structure, a first bearing assembly, and a second structure. The first structure has a first predetermined stiffness, and the first bearing assembly is mounted on the first structure. The second structure, which has a second predetermined stiffness, is mounted on the first bearing assembly, whereby relative motion about a first rotational axis is allowed between the first and second structure. At least one of the first structure and the second structure distort when a force is supplied thereto along the first rotational axis, and the distortion of at least one of the first structure and the second structure imparts a first preload force on the first bearing assembly.

20 Claims, 3 Drawing Sheets

(51) Int. Cl.
F16D 3/28      (2006.01)
F16D 11/06     (2006.01)
F16D 23/08     (2006.01)
G01C 21/18     (2006.01)

(56) References Cited

U.S. PATENT DOCUMENTS

| | | | | |
|---|---|---|---|---|
| 3,420,338 | A | | 1/1969 | Wheatley |
| 4,343,203 | A | * | 8/1982 | Jacobson ............... G01C 19/06 74/5 R |
| 4,452,654 | A | * | 6/1984 | KaDell, Jr. ............ F16C 23/00 156/160 |
| 8,919,213 | B2 | * | 12/2014 | Davis .................... B64G 1/286 74/5 R |

FOREIGN PATENT DOCUMENTS

| | | | |
|---|---|---|---|
| DE | 102008056024 | A1 | 5/2010 |
| EP | 0325073 | A1 | 7/1989 |
| EP | 2921655 | A2 | 9/2015 |
| FR | 1511079 | A | 1/1968 |
| GB | 2069629 | A | 8/1981 |

OTHER PUBLICATIONS

EP Examination Report for Application No. 17175862.6-1013 dated Feb. 26, 2019.

* cited by examiner

BEARING MOUNT AND PRELOAD ASSEMBLY

TECHNICAL FIELD

The present invention generally relates to bearing assemblies, and more particularly relates to a bearing mount and preload assembly.

BACKGROUND

Most mechanical systems that rely on relative rotational motion between system components include one or more bearing assemblies. The bearing assemblies, which may include, for example, inner and outer races, provide for the relative rotational motion between the system components with minimal friction. To avoid play or "slop" in the bearing assemblies, individual bearing preload assemblies may be preloaded with some sort of spring or flexure.

A typical preload assembly includes multiple components. For example, one particular type of preload assembly, which is depicted in FIG. 5, includes a spring 502, a cap 504, and a housing 506. The spring 502 and bearing assembly (or assemblies) 508 (only one depicted) are disposed within the housing 506. The spring 502, which supplies the preload force to the bearing assembly (or assemblies) 508, is retained within the housing via the cap 504. As may be appreciated, such preload assemblies add size, weight, and complexity to the overall mechanical system. This can become increasingly problematic as the system becomes smaller and/or more integrated.

Hence, there is a need for a bearing preload assembly that does not add size, weight, and/or complexity to a mechanical system. Most notably relatively small and/or integrated systems. The present invention addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, an assembly includes a first structure, a first bearing assembly, and a second structure. The first structure has a first predetermined stiffness, and the first bearing assembly is mounted on the first structure. The second structure, which has a second predetermined stiffness, is mounted on the first bearing assembly, whereby relative motion about a first rotational axis is allowed between the first and second structure. At least one of the first structure and the second structure distort when a force is supplied thereto along the first rotational axis, and the distortion of at least one of the first structure and the second structure imparts a first preload force on the first bearing assembly.

In another embodiment, an assembly includes a first structure, a first bearing assembly, a second bearing assembly, and a second structure. The first structure, which has a first predetermined stiffness, includes a first bearing mount portion and a second bearing mount portion spaced apart from the first bearing mount portion. The first bearing assembly is mounted on the first bearing mount portion, and the second bearing assembly is mounted on the second bearing mount portion. The second structure is mounted on and interconnects the first and second bearing assemblies, whereby relative motion between the first and second structures is allowed along a first rotational axis. The second structure has a second predetermined stiffness that is less than the first predetermined stiffness to thereby distort at least when a force is supplied thereto. The second structure, via its distortion, imparts preload forces on the first and second bearing assemblies.

In yet another embodiment, a gimbal mounting assembly includes an inner gimbal ring, a shaft, a first bearing assembly, a second bearing assembly, a third bearing assembly, a fourth bearing assembly, and an outer gimbal ring. The inner gimbal ring, which has a first predetermined stiffness, includes a first bearing mount portion and a second bearing mount portion spaced apart from the first bearing mount portion. The shaft includes a first end and a second end, and has a second predetermined stiffness. The first bearing assembly is mounted on the first bearing mount portion, the second bearing assembly is mounted on the second bearing mount portion, the third bearing assembly is mounted on the shaft at least adjacent to the first end, and the fourth bearing assembly is mounted on the shaft at least adjacent to the second end. The outer gimbal ring is mounted on and interconnects the first, second, third, and fourth bearing assemblies, whereby relative motion between the inner and outer gimbal rings is allowed along a first rotational axis, and whereby relative motion between the shaft and outer gimbal ring is allowed along a second rotational axis that is perpendicular to the first rotational axis. The outer gimbal ring has a third predetermined stiffness that is less than the first predetermined stiffness and the second predetermined stiffness to thereby distort at least when a force is supplied thereto along the first and second rotational axes. The outer gimbal ring, via its distortion, imparts equal magnitude first and second preload forces on the first and second bearing assemblies, respectively, and imparts equal magnitude third and fourth preload forces on the third and fourth bearing assemblies, respectively.

Furthermore, other desirable features and characteristics of the bearing mount and preload assembly will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
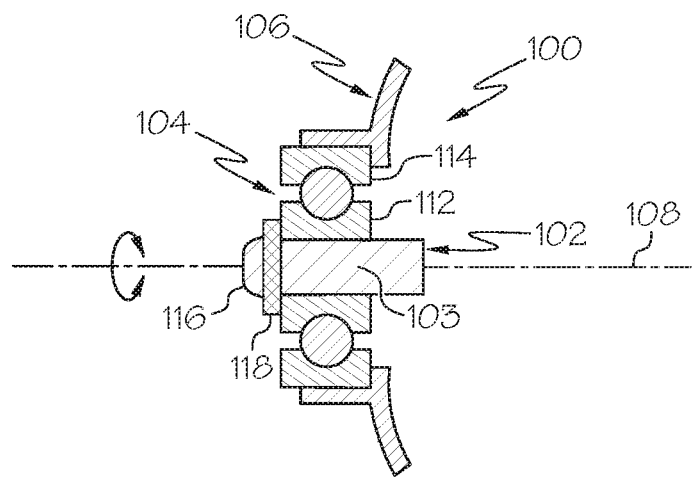
FIG. 1 depicts a simplified cross section view of a portion of a structural assembly that incorporates one embodiment of a bearing mount and preload assembly.

Referring first to FIG. 1, a simplified cross section view of a portion of a structural assembly 100 that incorporates a bearing mount and preload assembly is depicted, and includes at least a first structure 102, a first bearing assembly 104, and a second structure 106. The first structure 102 includes a bearing mount portion 103. As is seen, the first bearing assembly 104 is mounted on the bearing mount portion 103, and the second structure 106 is mounted on the first bearing assembly 104. Thus, relative motion about a first rotational axis 108 is allowed between the first and second structures 102, 106.

The bearing assembly 104 includes, as is generally known, an inner race 112 and an outer race 114. In the depicted embodiment, the inner race 112 engages the bearing mount portion 103, the outer race 114 engages the second structure 106, and the bearing assembly 104 is held in place, against the second structure 106, via suitable fastener hardware. Although the fastener hardware may vary, in the depicted embodiment it includes a simple threaded fastener 116, such as a screw, and a washer 118.

As FIG. 1 further depicts, the assembly 100 does not incorporate a conventional preload assembly. Instead, the preload is provided via the second structure 106. More specifically, via the relative stiffness of the second structure 106. That is, the first structure 102 is formed of a material having a first predetermined stiffness, and the second structure 106 is formed of a material having a second predetermined stiffness. In some embodiments the second predetermined stiffness is less than the first predetermined stiffness, in other embodiments it is equal to the first stiffness, and in still others it is greater than the first stiffness. Regardless of the relative values of the first and second predetermined stiffnesses, when a force is supplied to the second structure 106 along the first rotational axis 108, at least one of the first structure 102 and the second structure 106 distorts, and this distortion imparts a preload force on the first bearing assembly 104.

It will be appreciated that the materials of which the first and second structures 102, 106 are formed may vary. It will additionally be appreciated that the first and second stiffnesses may vary, so long as the second structure 106 distorts, relative to the first structure 102, when a load is applied thereto. Some example materials of the first and second structures 102, 106 include various metals, metal alloys, plastics, and composites that exhibit elasticity when a force is applied thereto. It will additionally be appreciated that the second structure 106 may be variously shaped. For example, it may be any one of numerous known closed shapes, such as round, diamond, rectangular, or star-shaped, just to name a few, or it may be any one of numerous known open shapes, such as C-shaped or L-shaped, just to name a few.

Figure 2:
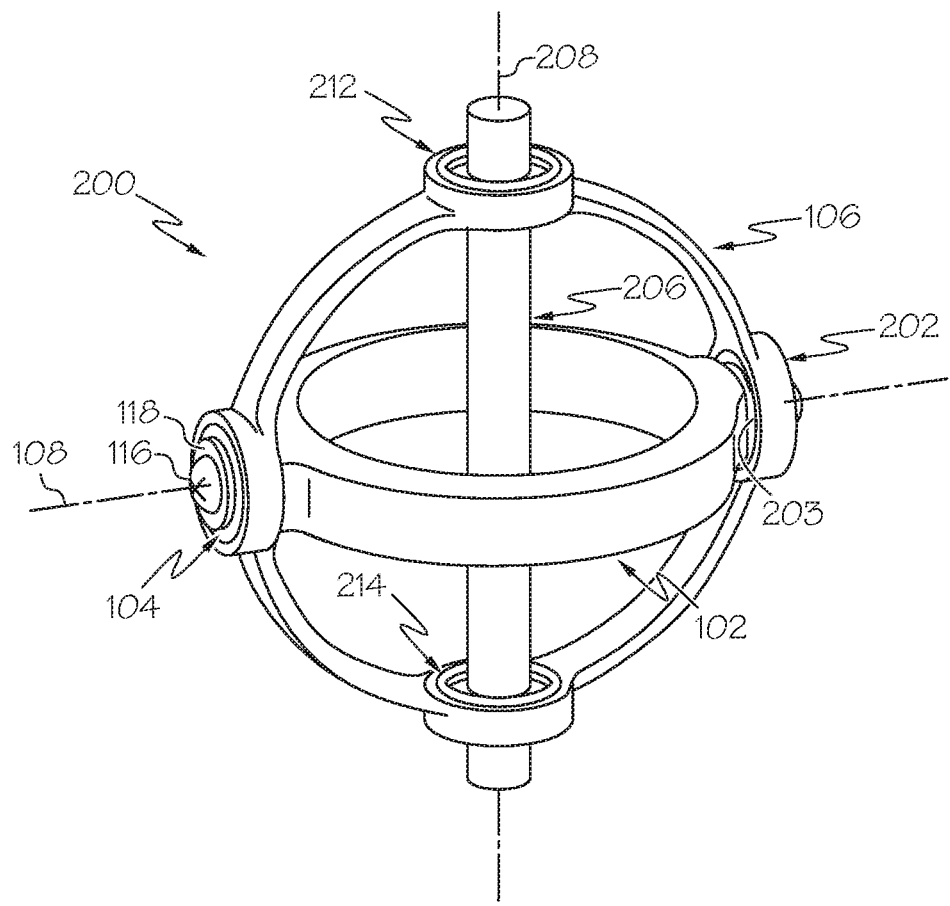
FIG. 2 depicts a perspective view of one embodiment of an actual physical implementation of a device that incorporates the bearing mount and preload configuration of FIG. 1.

Referring now to FIG. 2, a perspective view of one embodiment of an actual physical implementation of a device that incorporates the bearing mount and preload configuration of FIG. 1 is depicted. The depicted device is a gimbal mechanism 200, and the first structure 102 is configured as an inner gimbal ring, and the second structure 106 is configured as an outer gimbal ring. The depicted gimbal mechanism 200 additionally includes a second bearing assembly 202. The second bearing assembly 202 is mounted on a second bearing mount portion 203, which is formed on the inner gimbal ring (e.g., the first structure 102). Though not visible in FIG. 2, it will be appreciated that, similar to the first bearing assembly 104, the second bearing assembly 202 is held in place, against the second structure 106, via suitable fastener hardware.

The second bearing mount portion 203 is spaced apart from the first bearing mount portion 103, and is disposed on the first rotational axis 108. The outer gimbal ring (e.g., the second structure 106) is also mounted on the second bearing assembly 202 and, via its distortion, imparts a second preload force on the second bearing assembly 202. As may be appreciated, because the first and second bearing assemblies 104, 202 are disposed coaxially along the first rotational axis 108, the second preload force is equal in magnitude (but opposite in direction) to the first preload force.

As FIG. 2 also depicts, the gimbal mechanism 200, at least in the depicted embodiment, additionally includes a third structure 206. The third structure 206, which is implemented as a shaft in the depicted embodiment, is rotationally coupled to the outer gimbal ring (e.g., the second structure 106) to allow relative rotation between the shaft (e.g., the third structure 206) and the outer gimbal ring 106 about a second rotational axis 208 that is perpendicular to the first rotational axis 108.

As may be appreciated, the shaft 206 is rotationally coupled to the outer gimbal ring 106 via bearing assemblies. In particular, via a third bearing assembly 212 and a fourth bearing assembly 214. The third bearing assembly 212 is disposed between the shaft 206 and the outer gimbal ring 106. The fourth bearing assembly 214 is spaced apart from the third bearing assembly 212, and is also disposed between the shaft 206 and the outer gimbal ring 106. The outer gimbal ring 106 is configured such that it also distorts at least when a force is supplied thereto along the second rotational axis 208 and, via its distortion, imparts preload forces on the third and fourth bearing assemblies 212, 214. More specifically, it imparts a third preload force on the third bearing assembly 212, and a fourth preload force on the fourth bearing assembly 214. The third and fourth preload forces are equal in magnitude, but opposite in direction. It will be appreciated that in some embodiments the third and fourth bearing assemblies 212, 214 may be allowed to slide along the second rotational axis. In such embodiments, while there would be no preload on the third and fourth bearing assemblies 212, 214, there would still be a preload force on the first and second bearing assemblies 118, 202

It may be appreciated from the above description that the outer gimbal ring (e.g., second structure 106) implements at least two functions—mechanical support and preloading of all bearing assemblies 104, 202, 212, 214 in the first and second rotational axes 108, 208. The outer gimbal ring (e.g., second structure 106) may be configured such that the stiffnesses, and thus the preload force magnitudes, in the first and second axes 108, 208 may be equal or unequal. Thus, the outer gimbal ring (e.g., second structure 106) may be configured to have both a second predetermined stiffness in, for example, the first rotational axis 108, and a third predetermined stiffness in, for example, the second rotational axis 208 that is unequal to the second predetermined stiffness.

Figure 3:
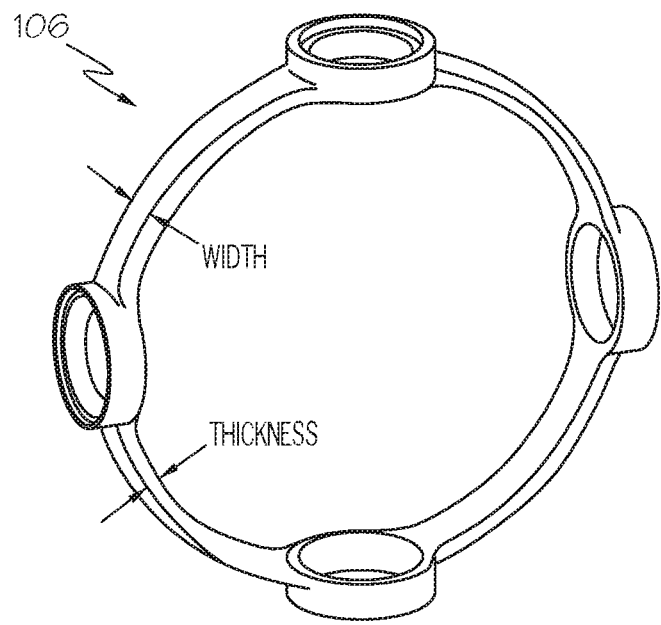
FIGS. 3 and 4 depict two different example mechanisms to implement different stiffnesses in a portion of the structures depicted in FIGS. 1 and 2.
Figure 4:
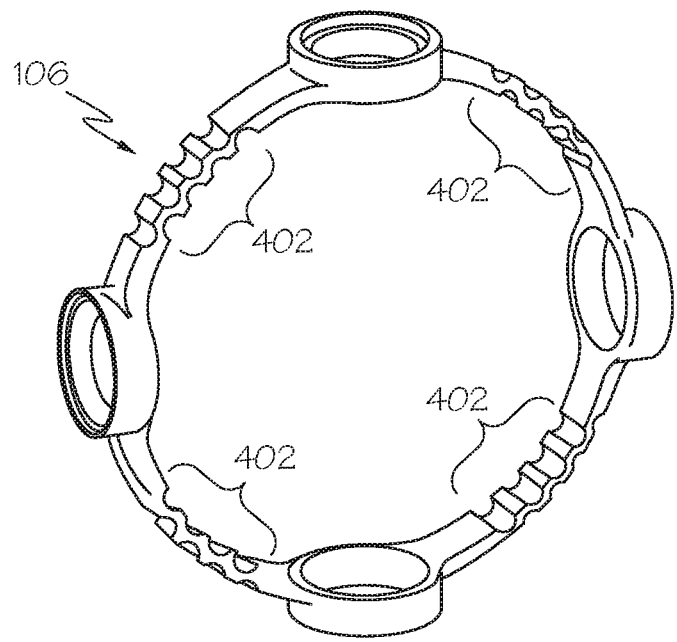
Figure 5:
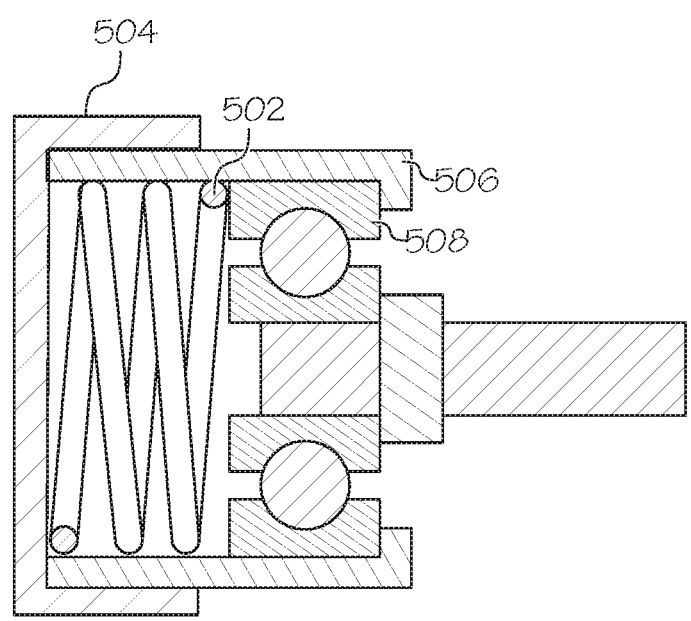
FIG. 5 depicts a simplified cross section view of one embodiment of a known bearing preload assembly.

The mechanism by which the outer gimbal ring (e.g., second structure 106) implements the different stiffnesses may be vary. For example, as FIG. 3 depicts, one or more dimensions (e.g., width, thickness, etc.) of the outer gimbal ring (e.g., second structure 106) may be sized to provide the second and third predetermined stiffnesses. Alternatively, or additionally, and as FIG. 4 depicts, the outer gimbal ring (e.g., second structure 106) may have a plurality of features 402, such as holes, notches, indentations, grooves or corrugations, formed therein that are dimensioned to provide the second and third predetermined stiffnesses.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An assembly, comprising:
a first structure having a first predetermined stiffness;
a first bearing assembly mounted on the first structure; and
a second structure mounted on the first bearing assembly, whereby relative motion about a first rotational axis is allowed between the first and second structures, the second structure having a second predetermined stiffness,
wherein:
the first predetermined stiffness is unequal to the second predetermined stiffness,
at least one of the first structure and the second structure distort when a force is supplied to the second structure along the first rotational axis, and
the distortion of at least one of the first structure and the second structure imparts a first preload force on the first bearing assembly.

2. The assembly of claim 1, further comprising:
a second bearing assembly spaced apart from the first bearing assembly and mounted on the first structure along the first rotational axis,
wherein:
the second structure is also mounted on the second bearing assembly, and
the distortion of at least one of the first structure and the second structure imparts a second preload force on the second bearing assembly, the second preload force equal in magnitude and opposite in direction to the first preload force.

3. The assembly of claim 2, further comprising:
a third structure rotationally coupled to the second structure to allow relative rotation between the second structure and the third structure about a second rotational axis, the second rotational axis perpendicular to the first rotational axis,
a third bearing assembly disposed between the third structure and the second structure; and
a fourth bearing assembly spaced apart from the third bearing assembly and disposed between the third structure and the second structure,
wherein:
the second structure distorts when a force is supplied thereto along the second rotational axis, and
the distortion of the second structure imparts a third preload force on the third bearing assembly and a fourth preload force on the fourth bearing assembly, the third and fourth preload forces equal in magnitude and opposite in direction.

4. The assembly of claim 3, wherein the first, second, third, and fourth preload force are equal in magnitude.

5. The assembly of claim 3, wherein:
the first and second preload forces are equal in magnitude;
the third and fourth preload forces are equal in magnitude; and
the first and third preload forces are unequal in magnitude.

6. The assembly of claim 5, wherein:
the second predetermined stiffness is in the first rotational axis; and
the second structure has a third predetermined stiffness in the second rotational axis, the third predetermined stiffness is less than the first predetermined stiffness and unequal to the second predetermined stiffness.

7. The assembly of claim 6, wherein one or more dimensions of the second structure are sized to provide the second and third predetermined stiffnesses.

8. The assembly of claim 6, wherein:
the second structure has a plurality of features formed therein; and
the features are dimensioned to provide the second and third predetermined stiffnesses.

9. An assembly, comprising:
a first structure including a first bearing mount portion and a second bearing mount portion spaced apart from the first bearing mount portion, the first structure having a first predetermined stiffness;
a first bearing assembly mounted on the first bearing mount portion;
a second bearing assembly mounted on the second bearing mount portion; and
a second structure mounted on and interconnecting the first and second bearing assemblies, whereby relative motion between the first and second structures is allowed along a first rotational axis, the second structure having a second predetermined stiffness that is less than the first predetermined stiffness to thereby distort at least when a force is supplied thereto,
wherein the second structure, via its distortion, imparts preload forces on the first and second bearing assemblies.

10. The assembly of claim 9, further comprising:
a third structure rotationally coupled to the second structure to allow relative rotation between the second structure and the third structure about a second rotational axis, the second rotational axis perpendicular to the first rotational axis a third bearing assembly disposed between the third structure and the second structure; and a fourth bearing assembly spaced apart from the third bearing assembly and disposed between the third structure and the second structure, wherein the second structure distorts at least when a force is supplied thereto along the second rotational axis and, via its distortion, imparts a third preload force on the third bearing assembly and a fourth preload force on the fourth bearing assembly, the third and fourth preload forces equal in magnitude.

11. The assembly of claim 10, wherein the first, second, third, and fourth preload force are equal in magnitude.

12. The assembly of claim 10, wherein:
the first and second preload forces are equal in magnitude;
the third and fourth preload forces are equal in magnitude; and
the first and third preload forces are unequal in magnitude.

13. The assembly of claim 12, wherein:
the second predetermined stiffness is in the first rotational axis; and
the second structure has a third predetermined stiffness in the second rotational axis, the third predetermined stiffness is less than the first predetermined stiffness and unequal to the second predetermined stiffness.

14. The assembly of claim 13, wherein one or more dimensions of the second structure are sized to provide the second and third predetermined stiffnesses.

15. The assembly of claim 13, wherein:
the second structure has a plurality of features formed therein; and
the features are dimensioned to provide the second and third predetermined stiffnesses.

16. A gimbal mounting assembly, comprising:
a inner gimbal ring including a first bearing mount portion and a second bearing mount portion spaced apart from the first bearing mount portion, the inner gimbal ring having a first predetermined stiffness;
a shaft including a first end and a second end, and having a second predetermined stiffness;
a first bearing assembly mounted on the first bearing mount portion;
a second bearing assembly mounted on the second bearing mount portion;
a third bearing assembly mounted on the shaft at least adjacent to the first end;
a fourth bearing assembly mounted on the shaft at least adjacent to the second end; and
an outer gimbal ring mounted on and interconnecting the first, second, third, and fourth bearing assemblies, whereby relative motion between the inner and outer gimbal rings is allowed along a first rotational axis, and whereby relative motion between the shaft and outer gimbal ring is allowed along a second rotational axis that is perpendicular to the first rotational axis, wherein:
the outer gimbal ring has a third predetermined stiffness that is less than the first predetermined stiffness and the second predetermined stiffness to thereby distort at least when a force is supplied thereto along the first and second rotational axes, and
the outer gimbal ring, via its distortion, imparts equal magnitude first and second preload forces on the first and second bearing assemblies, respectively, and imparts equal magnitude third and fourth preload forces on the third and fourth bearing assemblies, respectively.

17. The assembly of claim 16, wherein the preload forces are equal in magnitude.

18. The assembly of claim 17, wherein:
the third predetermined stiffness is in the first rotational axis;
the outer gimbal has a fourth predetermined stiffness in the second rotational axis, the third predetermined stiffness is less than the first predetermined stiffness and unequal to the second predetermined stiffness; and
the first and third preload forces are unequal in magnitude.

19. The assembly of claim 18, wherein one or more dimensions of the second structure are sized to provide the second and third predetermined stiffnesses.

20. The assembly of claim 18, wherein:
the second structure has a plurality of features formed therein; and
the features are dimensioned to provide the second and third predetermined stiffnesses.

* * * * *